United States Patent

Matsunaga et al.

(10) Patent No.: US 12,044,816 B2
(45) Date of Patent: Jul. 23, 2024

(54) RADIATION DETECTOR AND RADIATION DETECTION APPARATUS

(71) Applicant: HORIBA, LTD., Kyoto (JP)

(72) Inventors: Daisuke Matsunaga, Kyoto (JP); Seiji Ikawa, Kyoto (JP); Yuji Okubo, Kyoto (JP)

(73) Assignee: HORIBA, LTD., Kyoto (JP)

( * ) Notice: Subject to any disclaimer, the term of this patent is extended or adjusted under 35 U.S.C. 154(b) by 118 days.

(21) Appl. No.: 17/999,302

(22) PCT Filed: Mar. 28, 2022

(86) PCT No.: PCT/JP2022/015111
§ 371 (c)(1),
(2) Date: Nov. 18, 2022

(87) PCT Pub. No.: WO2022/230538
PCT Pub. Date: Nov. 3, 2022

(65) Prior Publication Data
US 2023/0228891 A1    Jul. 20, 2023

(30) Foreign Application Priority Data

Apr. 30, 2021 (JP) ................. 2021-078085

(51) Int. Cl.
*G01T 7/00* (2006.01)
*G01N 23/223* (2006.01)

(52) U.S. Cl.
CPC .............. *G01T 7/00* (2013.01); *G01N 23/223* (2013.01)

(58) Field of Classification Search
CPC ......... G01T 7/00; G01T 1/244; G01N 23/223; G01N 23/2252; G01N 2223/076; G01N 2223/079; G01N 2223/507
See application file for complete search history.

(56) References Cited

U.S. PATENT DOCUMENTS 7,649,178 B2 *  1/2010  Petrillo ............. H01M 10/4207
                                                     250/370.09
2014/0021361 A1  1/2014  Yasui et al.
(Continued)

FOREIGN PATENT DOCUMENTS

DE   102010044289 A1   3/2012
JP   S60192285 A       9/1985
(Continued)

OTHER PUBLICATIONS

International Search Report for the corresponding Patent Application No. PCT/JP2022/015111 dated Jun. 14, 2022, with English translation.
(Continued)

*Primary Examiner* — Kiho Kim
(74) *Attorney, Agent, or Firm* — LUCAS & MERCANTI, LLP

(57) ABSTRACT

A radiation detector includes a radiation detection element, a circuit element, and a housing accommodating the radiation detection element and the circuit element, in which a closed space is provided. The housing has an unblocked opening portion, the closed space is disposed inside the housing, the circuit element is disposed in the closed space, and the closed space is decompressed or filled with an inert gas or a dry gas.

12 Claims, 11 Drawing Sheets

(56) References Cited

U.S. PATENT DOCUMENTS

| | | |
|---|---|---|
| 2014/0124665 A1 | 5/2014 | Yasui et al. |
| 2019/0257960 A1 | 8/2019 | Hasegawa et al. |
| 2020/0355837 A1 | 11/2020 | Matsunaga et al. |

FOREIGN PATENT DOCUMENTS

| | | |
|---|---|---|
| JP | 2006-125969 A | 5/2006 |
| JP | 2010237138 A | 10/2010 |
| JP | 2011-196876 A | 10/2011 |
| JP | 2014-021000 A | 2/2014 |
| JP | 2014-092448 A | 5/2014 |
| JP | 2019-144172 A | 8/2019 |
| WO | 2019-117272 A1 | 6/2019 |

OTHER PUBLICATIONS

European Patent Office, "Extended European Search Report" issued for European patent application No. 222795455.9 on Apr. 5, 2024, 7 pages.

\* cited by examiner

FIG.9
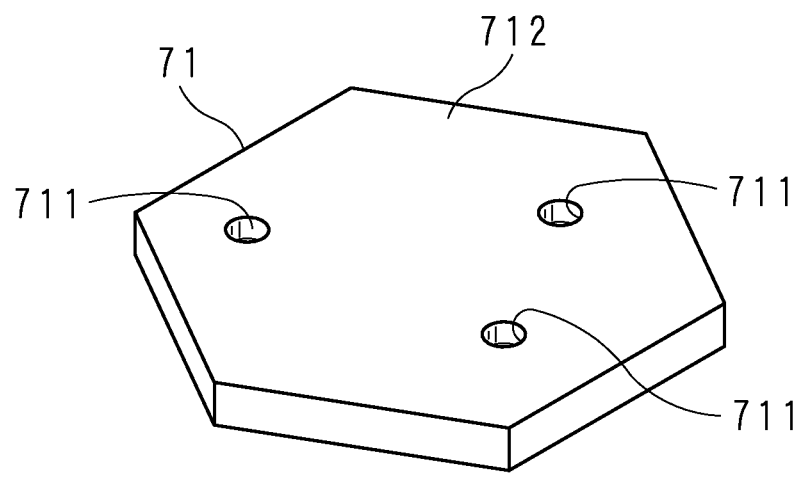
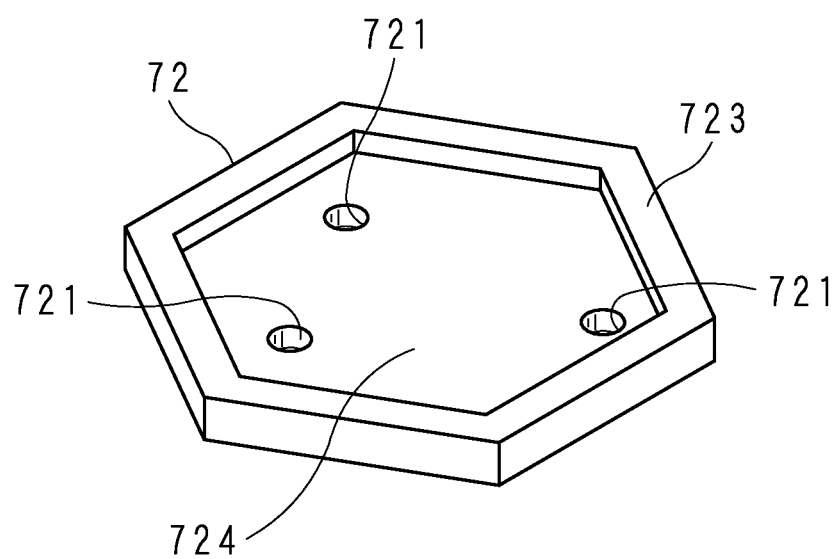

RADIATION DETECTOR AND RADIATION DETECTION APPARATUS

CROSS REFERENCE TO RELATED APPLICATION

This Application is a 371 of PCT/JP2022/015111 filed on Mar. 28, 2022 which, in turn, claimed the priority of Japanese Patent Application No. 2021-078085 filed on Apr. 30, 2021, both applications are incorporated herein by reference.

TECHNICAL FIELD

Field

The present invention relates to a radiation detector and a radiation detection apparatus.

BACKGROUND

A radiation detector detecting radiation such as X-rays may include a radiation detection element using a semiconductor. In addition, the radiation detector is provided with a circuit element such as a preamplifier amplifying a signal output by the radiation detection element. The radiation detector includes a housing, and the radiation detection element and the circuit element are disposed inside the housing. For example, a substrate is disposed inside the housing, the radiation detection element is provided on the surface of the substrate, and the circuit element is provided on the back surface of the substrate.

In many cases, the housing is provided with a window having a window material formed of a radiation-transmitting material. Radiation transmitted through the window material is detected. Radiation that cannot be transmitted through the window material due to the low energy thereof cannot be detected by the radiation detector. In this regard, radiation detectors have been developed that are capable of detecting low-energy radiation by window material elimination. International Publication No. WO2019/117272 discloses an example of a window material-less radiation detector.

SUMMARY

In a case where the window material-less radiation detector is used in a normal-pressure or low-vacuum environment, a gas such as water vapor enters from the outside to the inside of the radiation detector. Gas adsorption to a circuit element in the radiation detector may occur to cause circuit element deterioration and degradation in the performance of the radiation detector.

The present disclosure has been made in view of such circumstances, and an object is to provide a radiation detector and a radiation detection apparatus capable of suppressing degradation in performance.

A radiation detector according to an aspect of the present disclosure includes a radiation detection element, a circuit element, and a housing accommodating the radiation detection element and the circuit element, is characterized in that a closed space is provided, the housing has an unblocked opening portion, the closed space is disposed inside the housing, the circuit element is disposed in the closed space, and the closed space is decompressed or filled with an inert gas or a dry gas.

In one aspect of the present disclosure, the housing of the radiation detector has the unblocked opening portion. The radiation detector includes the closed space, and the circuit element such as an amplifier is disposed in the closed space. A gas such as water vapor is capable of entering the inside of the housing through the opening portion but does not enter the closed space. Accordingly, even in a case where the radiation detector is used in a normal-pressure or low-vacuum environment, the gas that has entered from the outside is not adsorbed to the circuit element. In addition, the inside of the closed space is decompressed or filled with an inert or dry gas. It is difficult for the water or gas in the closed space to be adsorbed to the circuit element, and a reaction degrading the circuit element is unlikely to occur even in the event of inert gas adsorption to the circuit element. Accordingly, deterioration of the circuit element attributable to water or gas adsorption is prevented.

In the radiation detector according to an aspect of the present disclosure, it is characterized in that the radiation detection element is disposed at a position facing the opening portion.

In one aspect of the present disclosure, the radiation detection element faces the opening portion. The radiation incident on the radiation detection element passes through the opening portion and does not have to be transmitted through a window material. Accordingly, the radiation detector is capable of detecting radiation that cannot be transmitted through a window material due to the low energy thereof.

A radiation detector according to an aspect of the present disclosure includes a radiation detection element having an incident surface where radiation is incident and a circuit element, is characterized in that a closed space disposed at a position not facing the incident surface is provided, the circuit element is disposed in the closed space, and the closed space is decompressed or filled with an inert gas or a dry gas.

In one aspect of the present disclosure, the radiation detector includes the closed space and the circuit element such as an amplifier is disposed in the closed space. The incident surface of the radiation detection element does not face the closed space. A gas such as water vapor does not enter the closed space. Accordingly, gas adsorption to the circuit element does not occur. In addition, the inside of the closed space is decompressed or filled with an inert or dry gas. Water or gas adsorption to the circuit element is unlikely to occur, and deterioration of the circuit element attributable to water or gas adsorption is prevented.

In the radiation detector according to an aspect of the present disclosure, it is characterized in that the radiation detection element has an electrode connected to the circuit element, and the electrode faces the closed space.

In one aspect of the present disclosure, the radiation detection element includes the electrode for connection to the circuit element and the electrode faces the closed space. As a result, water or gas adsorption to the electrode is unlikely to occur. Even in the event of inert gas adsorption to the electrode, a reaction degrading the electrode is unlikely to occur. Accordingly, degradation in the performance of the radiation detection element attributable to electrode deterioration is prevented.

The radiation detector according to an aspect of the present disclosure, is characterized by further comprising a moisture getter taking in moisture in the closed space.

In one aspect of the present disclosure, the moisture getter takes in the moisture in the closed space. Accordingly, water adsorption to the circuit element is more effectively prevented.

The radiation detector according to an aspect of the present disclosure, is characterized by further comprising a gas getter taking in a gas in the closed space.

In one aspect of the present disclosure, the gas getter takes in the gas in the closed space. Accordingly, gas adsorption to the circuit element is more effectively prevented.

The radiation detector according to an aspect of the present disclosure, is characterized by further comprising: a substrate having a first surface and a second surface positioned behind the first surface; and a plate-shaped member, wherein the substrate has a through hole penetrating the substrate between the first surface and the second surface, the radiation detection element is disposed on the first surface and blocks one end of the through hole, the plate-shaped member is disposed so as to face the second surface and blocks the other end of the through hole, and the closed space is a space in the through hole blocked at both ends by the radiation detection element and the plate-shaped member.

In one aspect of the present disclosure, the radiation detector includes the substrate having the through hole, the radiation detection element is disposed so as to block one end of the through hole, and the plate-shaped member is disposed so as to block the other end of the through hole. The space in the through hole is to be the closed space by the radiation detection element and the plate-shaped member blocking both ends of the through hole. The closed space where no gas enters is configured with ease.

The radiation detector according to an aspect of the present disclosure, is characterized by further comprising: a substrate having a first surface and a second surface positioned behind the first surface; and a plate-shaped member having a cavity inside, wherein the substrate has a through hole penetrating the substrate between the first surface and the second surface, the radiation detection element is disposed on the first surface and blocks one end of the through hole, the plate-shaped member is disposed so as to face the second surface and blocks the other end of the through hole, the plate-shaped member has a connecting hole smaller in diameter than the through hole and connecting a space in the through hole and the cavity, at a part facing the second surface, the closed space includes the space in the through hole blocked at both ends by the radiation detection element and the plate-shaped member and the cavity connected to the space via the connecting hole, and a moisture getter taking in moisture in the closed space or a gas getter taking in a gas in the closed space is disposed at a position in the cavity different from the connecting hole.

In one aspect of the present disclosure, the radiation detector includes the substrate having the through hole, the radiation detection element is disposed so as to block one end of the through hole, and the plate-shaped member is disposed so as to block the other end of the through hole. The plate-shaped member has the cavity inside and has the connecting hole connecting the space in the through hole and the cavity. The closed space including the space in the through hole and the cavity connected to the space via the connecting hole is configured. The moisture getter or the gas getter is disposed at the position in the cavity different from the connecting hole. A part of a shield plate is between the moisture getter or the gas getter and the radiation detection element, and characteristic X-rays from the moisture getter or the gas getter are shielded by the shield plate. Accordingly, a system peak attributable to the moisture getter or the gas getter is unlikely to occur.

The radiation detector according to an aspect of the present disclosure, is characterized by further comprising a cooling unit for cooling the radiation detection element.

In one aspect of the present disclosure, the radiation detector includes the cooling unit such as a Peltier element for cooling the radiation detection element. The cooling of the radiation detection element leads to noise reduction and radiation detection accuracy improvement. Even with the radiation detection element cooled, adsorption of a gas such as water vapor to the circuit element is prevented.

In the radiation detector according to an aspect of the present disclosure, it is characterized in that the circuit element configures at least a part of an amplifier circuit amplifying a signal output by the radiation detection element.

In one aspect of the present disclosure, the circuit element configures at least a part of the amplifier circuit. Deterioration of the amplifier circuit is prevented, and thus deterioration of the signal output from the radiation detector is prevented and degradation in radiation detection accuracy is suppressed.

A radiation detection apparatus according to an aspect of the present disclosure, is characterized by comprising: the radiation detector according to an aspect of the present disclosure; and a spectrum generation unit generating a spectrum of radiation detected by the radiation detector.

A radiation detection apparatus according to an aspect of the present disclosure, is characterized by comprising: an irradiation unit irradiating a sample with radiation; the radiation detector according to an aspect of the present disclosure detecting radiation generated from the sample; a spectrum generation unit generating a spectrum of the radiation detected by the radiation detector; and a display unit displaying the spectrum generated by the spectrum generation unit.

In one aspect of the present disclosure, deterioration of the circuit element attributable to gas adsorption to the circuit element of the radiation detector is prevented. Accordingly, degradation in the performance of the radiation detector is suppressed. In particular, even in a case where the window material-less radiation detector is used in a normal-pressure or low-vacuum environment, degradation in the performance of the radiation detector is suppressed.

According to an aspect of the present disclosure, amplifier deterioration attributable to water or gas adsorption is prevented, and thus excellent effects such as suppressing degradation in the performance of the radiation detector are exhibited.

The above and further objects and features will more fully be apparent from the following detailed description with accompanying drawings.

BRIEF DESCRIPTION OF THE DRAWINGS

FIG. 9 is a schematic perspective view illustrating a first shield plate and a second shield plate.

DETAILED DESCRIPTION

Hereinafter, the present disclosure will be specifically described with reference to the drawings illustrating embodiments thereof.

Embodiment 1

Figure 1:
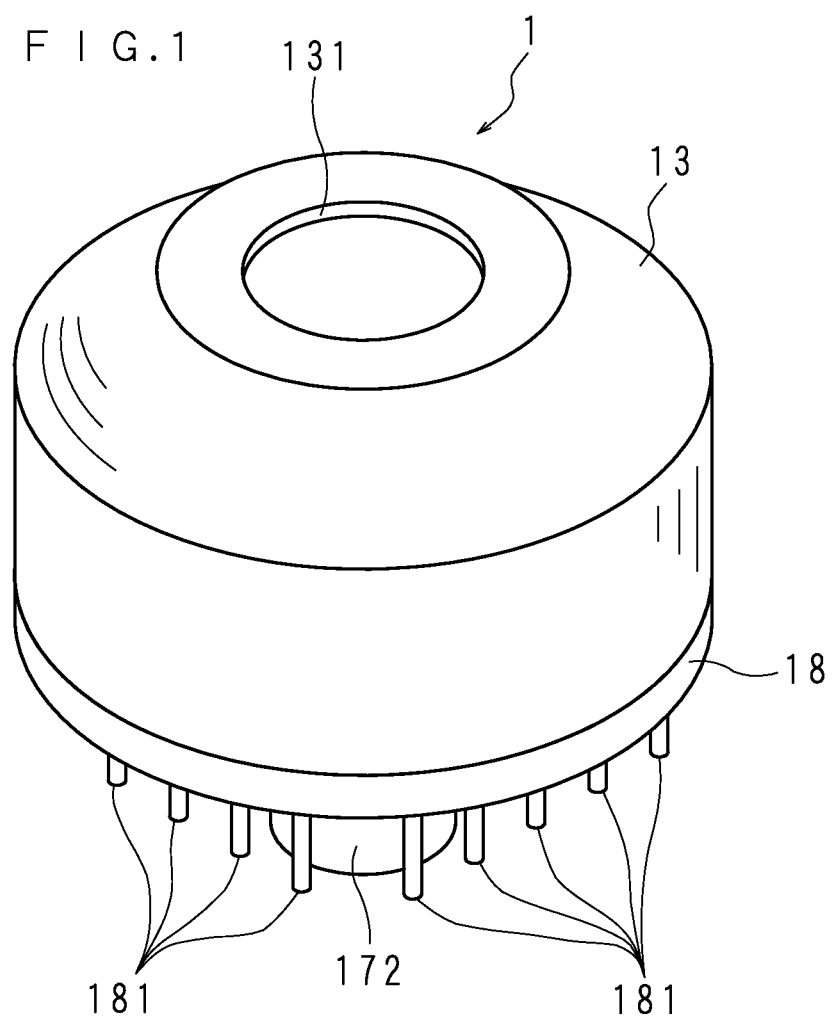
FIG. 1 is a schematic perspective view illustrating an example of the appearance of a radiation detector according to Embodiment 1.
Figure 2:
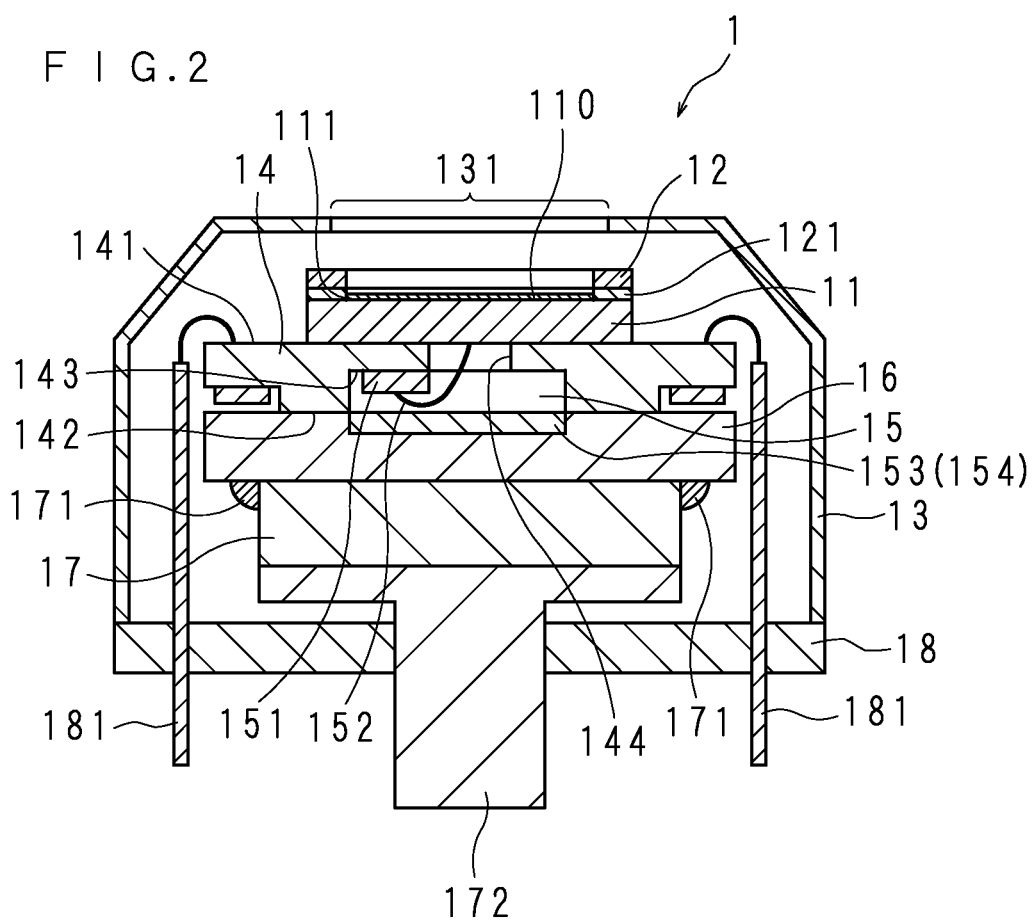
FIG. 2 is a schematic cross-sectional view illustrating a configuration example of the radiation detector according to Embodiment 1.
Figure 3:
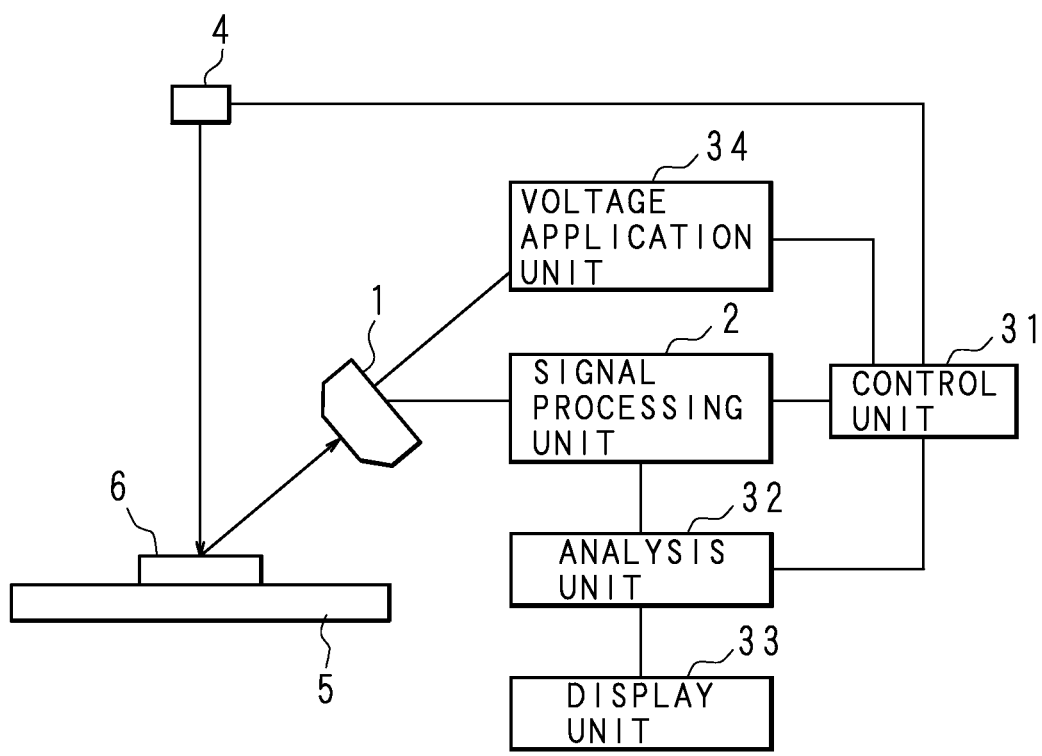
FIG. 3 is a block diagram illustrating a functional configuration example of a radiation detection apparatus.

FIG. 1 is a schematic perspective view illustrating an example of the appearance of a radiation detector 1 according to Embodiment 1. FIG. 2 is a schematic cross-sectional view illustrating a configuration example of the radiation detector 1 according to Embodiment 1. FIG. 3 is a block diagram illustrating a functional configuration example of a radiation detection apparatus 10. The radiation detection apparatus 10 is, for example, a fluorescent X-ray analyzer. The radiation detection apparatus 10 includes an irradiation unit 4 irradiating a sample 6 with radiation such as electron beams or X-rays, a sample table 5 where the sample 6 is placed, and the radiation detector 1. Radiation is emitted from the irradiation unit 4 to the sample 6, radiation such as fluorescent X-rays is generated at the sample 6, and the radiation detector 1 detects the radiation generated from the sample 6. In the drawing, the radiation is indicated by arrows. The radiation detector 1 outputs a signal proportional to the energy of the detected radiation. It should be noted that the radiation detection apparatus 10 in another form may hold the sample 6 by a method other than placement on the sample table 5.

Connected to the radiation detector 1 are a signal processing unit 2 processing the output signal and a voltage application unit 34 applying a voltage necessary for radiation detection to a radiation detection element 11 of the radiation detector 1. The signal processing unit 2 detects a signal value corresponding to the energy of the radiation detected by the radiation detector 1 by detecting the wave height of the pulse signal output by the radiation detector 1. An analysis unit 32 is connected to the signal processing unit 2. The analysis unit 32 is configured to include a calculation unit performing calculation and a memory storing data. The signal processing unit 2, the analysis unit 32, the voltage application unit 34, and the irradiation unit 4 are connected to a control unit 31. The control unit 31 controls the operations of the signal processing unit 2, the analysis unit 32, the voltage application unit 34, and the irradiation unit 4.

The signal processing unit 2 outputs data indicating the detected signal value to the analysis unit 32. Based on the data from the signal processing unit 2, the analysis unit 32 counts the signal of each value and performs processing to generate the relationship between the energy of the radiation and the count number, that is, the spectrum of the radiation. The signal processing unit 2 and the analysis unit 32 correspond to a spectrum generation unit. In addition, the analysis unit 32 performs qualitative analysis or quantitative analysis of elements contained in the sample 6 based on the spectrum. It should be noted that the signal processing unit 2 may generate the radiation spectrum.

A display unit 33 such as a liquid crystal display is connected to the analysis unit 32. The display unit 33 displays the spectrum generated by the analysis unit 32 and the analysis result by the analysis unit 32. The control unit 31 may be configured to receive a user operation and control each unit of the radiation detection apparatus 10 in accordance with the received operation. In addition, the control unit 31 and the analysis unit 32 may be configured by the same computer.

As illustrated in FIGS. 1 and 2, the radiation detector 1 includes a plate-shaped bottom plate portion 18. One surface side of the bottom plate portion 18 is covered with a cap-shaped cover 13. The cover 13 has a shape in which a truncated cone is connected to one end of a cylinder, and the other end of the cylinder is joined to the bottom plate portion 18. An opening portion 131 is formed at the truncated part of the tip of the cover 13. A window having a window material is not provided in the opening portion 131, and the opening portion 131 is blocked by no window materials. The cover 13 and the bottom plate portion 18 configure the housing of the radiation detector 1. The cover 13 and the bottom plate portion 18 accommodate other parts of the radiation detector 1. Gas can be exchanged between the inside and outside of the cover 13 and the bottom plate portion 18.

The radiation detection element 11, a collimator 12, a substrate 14, a shield plate 16, a Peltier element 17, and a cold finger 172 are disposed inside the cover 13. The substrate 14 has a first surface 141 facing the opening portion 131, and the radiation detection element 11 is disposed on the first surface 141. An interposed object such as an adhesive may be present between the substrate 14 and the radiation detection element 11. The substrate 14 is desirably formed of a material that generates as little radiation as possible when irradiated with radiation. The material of the substrate 14 is, for example, ceramic. For example, the radiation detection element 11 is a silicon drift-type radiation detection element, and the radiation detector 1 is a silicon drift detector (SDD). For example, the radiation detection element 11 is plate-shaped. The radiation detection element 11 is disposed at a position facing the opening portion 131. The radiation detection element 11 has an incident surface 110 where radiation to be detected is incident, and the incident surface 110 is disposed so as to face the opening portion 131.

The collimator 12 has a tubular shape with both ends open and is made of a radiation shielding material. The collimator 12 is disposed between the radiation detection element 11 and the opening portion 131. One end of the collimator 12 faces the opening portion 131, and the other end faces the incident surface 110 of the radiation detection element 11. An adhesive layer 121 consisting of an insulating adhesive and coating is provided between the collimator 12 and the radiation detection element 11. The collimator 12 is attached to the incident surface 110 of the radiation detection element 11 via the adhesive layer 121. Radiation is incident on the inside of the cover 13 mainly through the opening portion 131, the collimator 12 shields part of the radiation, and the radiation detection element 11 detects the radiation not shielded by the collimator 12.

The substrate 14 has a second surface 142 positioned behind the first surface 141. The shield plate 16 is disposed at a position facing the second surface 142. The shield plate 16 corresponds to a plate-shaped member. The shield plate 16 shields radiation incident from outside the shield plate 16 when viewed from the radiation detection element 11. The shield plate 16 is in contact with the second surface 142. An interposed object such as an adhesive may be interposed between the shield plate 16 and the second surface 142.

The Peltier element 17 has a heat-absorbing part that is in thermal contact with the back surface of the shield plate 16 behind the surface of the shield plate 16 in contact with the substrate 14. The Peltier element 17 may be in direct contact with the shield plate 16 or a thermally conductive substance may be interposed between the Peltier element 17 and the shield plate 16. A waterproof coating material 171 is applied around the part where the Peltier element 17 and the shield plate 16 are in contact with each other. The waterproof coating material 171 is, for example, a waterproof resin. The waterproof coating material 171 prevents water generated by cooling from entering between the Peltier element 17 and the shield plate 16.

The Peltier element 17 has a heat-dissipating part that is in thermal contact with the cold finger 172. The cold finger 172 is configured to include a flat plate-shaped part with which the heat-dissipating part of the Peltier element 17 is in thermal contact and a bolt-shaped part protruding from the flat plate-shaped part. The bolt-shaped part of the cold finger 172 penetrates the bottom plate portion 18 and protrudes from the outer surface of the bottom plate portion 18. The Peltier element 17 may be in direct contact with the cold finger 172 or a thermally conductive substance may be interposed between the Peltier element 17 and the cold finger 172. The cold finger 172 is formed of a material with high thermal conductivity. The bolt-shaped part of the cold finger 172 is connected to a heat-dissipating portion outside the radiation detector 1. The heat-dissipating portion is, for example, a heat sink.

The heat of the radiation detection element 11 is conducted to the heat-absorbing part of the Peltier element 17 through the substrate 14 and the shield plate 16. The heat is released from the heat-dissipating part of the Peltier element 17 to the outside of the radiation detector 1 through the cold finger 172. In this manner, the heat of the radiation detection element 11 is released to the outside of the radiation detector 1 and the radiation detection element 11 is cooled. The Peltier element 17 corresponds to a cooling unit. The shield plate 16 is desirably made of a thermally conductive material higher in thermal conductivity than the substrate 14 such that the heat of the radiation detection element 11 can be efficiently conducted to the Peltier element 17. For example, the material of the shield plate 16 is alumina. The thermal conductivity of alumina is somewhat high. In addition, aluminum contained in alumina has low excitation efficiency by radiation and causes few system peaks attributable to characteristic X-rays generated from aluminum being incident on the radiation detection element 11. It should be noted that the radiation detector 1 in another form may release heat through the bottom plate portion 18 without including the cold finger 172.

The substrate 14 is provided with an amplifier 151 as will be described later. The amplifier 151 corresponds to a circuit element. The amplifier 151 is connected to the radiation detection element 11 via a bonding wire 152. In addition, the substrate 14 is provided with a circuit. The amplifier 151 is connected to the circuit. The circuit may include a circuit element other than the amplifier 151.

The radiation detector 1 further includes a plurality of lead pins 181. The lead pin 181 penetrates the bottom plate portion 18. One end of the lead pin 181 is connected via a bonding wire to the circuit provided on the substrate 14. Electric power supply and signal input and output with respect to the radiation detection element 11 are performed through the lead pins 181.

The amplifier 151 configures at least a part of an amplifier circuit amplifying the signal output by the radiation detection element 11. For example, other parts of the amplifier circuit are included in the signal processing unit 2. For example, the amplifier 151 is a preamplifier. The radiation detection element 11 outputs a signal proportional to the energy of the detected radiation, and the output signal is input to the amplifier 151 through the bonding wire 152. The amplifier 151 performs signal conversion and amplification. The converted and amplified signal is output from the amplifier 151 and output to the outside of the radiation detector 1 through the lead pin 181. In this manner, the radiation detector 1 outputs a signal proportional to the energy of the radiation detected by the radiation detection element 11. The output signal is input to the signal processing unit 2. It should be noted that the amplifier 151 may have a non-preamplifier function.

Figure 4:
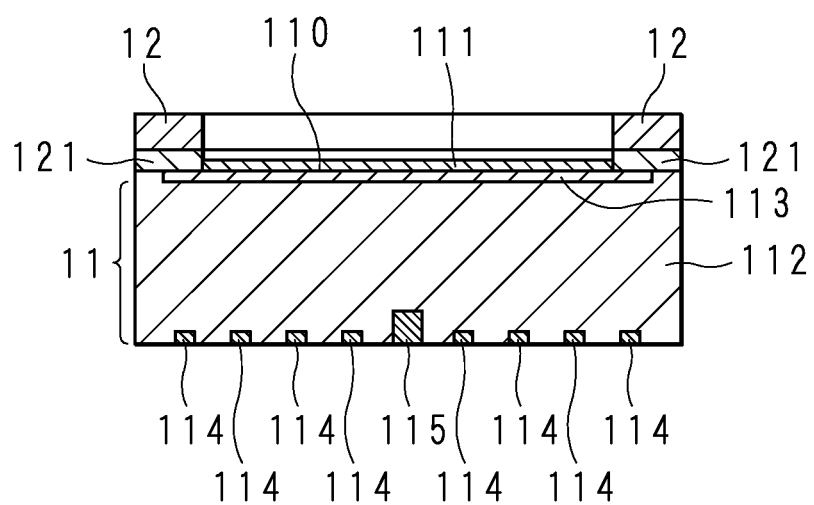
FIG. 4 is a schematic cross-sectional view illustrating a radiation detection element and a collimator.

FIG. 4 is a schematic cross-sectional view illustrating the radiation detection element 11 and the collimator 12. A part of the incident surface 110 of the radiation detection element 11 is covered with the collimator 12 and the adhesive layer 121. The part that includes the middle part of the incident surface 110 and is not covered with the collimator 12 and the adhesive layer 121 is covered with a light shielding film 111.

The radiation detection element 11 has a plate-shaped semiconductor portion 112. The component of the semiconductor portion 112 is, for example, n-type silicon (Si). The incident surface 110 of the radiation detection element 11 is provided with a first electrode 113. The first electrode 113 is continuously provided in the region that includes the middle part of the incident surface 110. The first electrode 113 is provided up to the vicinity of the peripheral edge of the incident surface 110 and occupies most of the incident surface 110. The first electrode 113 is connected to the voltage application unit 34. Multiple loop-shaped second electrodes 114 are provided on the back surface of the radiation detection element 11 behind the incident surface 110. In addition, a signal output electrode 115 outputting a signal during radiation detection is provided at the position surrounded by the multiple second electrodes 114. The signal output electrode 115 is connected to the amplifier 151 via the bonding wire 152. Of the multiple second electrodes 114, the second electrode 114 closest to the signal output electrode 115 and the second electrode 114 farthest from the signal output electrode 115 are connected to the voltage application unit 34.

The voltage application unit 34 performs voltage application to the multiple second electrodes 114 such that the second electrode 114 closest to the signal output electrode 115 has the highest potential and the second electrode 114 farthest from the signal output electrode 115 has the lowest potential. In addition, the radiation detection element 11 is configured such that a predetermined electrical resistance is generated between the adjacent second electrodes 114. For example, by adjusting the chemical composition of a part of the semiconductor portion 112 positioned between the adjacent second electrodes 114, an electrically resistive channel to which two second electrodes 114 are connected is formed.

In other words, the multiple second electrodes 114 are connected in a daisy chain via electrical resistance. By applying a voltage from the voltage application unit 34 to the multiple second electrodes 114, the respective second electrodes 114 have potentials that monotonically increase in order from the second electrode 114 far from the signal output electrode 115 toward the second electrode 114 close to the signal output electrode 115. It should be noted that the plurality of second electrodes 114 may include a pair of adjacent second electrodes 114 with the same potential.

The potentials of the plurality of second electrodes 114 generate an electric field in the semiconductor portion 112, in which the potential increases in stages as the distance to the signal output electrode 115 decreases and decreases in stages as the distance to the signal output electrode 115 increases. Further, the voltage application unit 34 applies a voltage to the first electrode 113 such that the first electrode 113 is lower in potential than the second electrode 114 with the highest potential. In this manner, a voltage is applied to the semiconductor portion 112 between the first electrode 113 and the second electrodes 114, and an electric field with a potential increasing as the distance to the signal output electrode 115 decreases is generated in the semiconductor portion 112.

The radiation detector 1 is disposed such that the opening portion 131 faces the placement surface of the sample table 5. Radiation from the sample 6 is incident on the radiation detection element 11 through the opening portion 131. The radiation is absorbed by the semiconductor portion 112, and electric charges corresponding in amount to the energy of the absorbed radiation are generated. The generated electric charges are electrons and holes. The generated electric charges are moved by the electric field in the semiconductor portion 112, and one type of electric charge flows into the signal output electrode 115. In the present embodiment, in a case where the signal output electrode 115 is n-type, electrons generated by radiation incidence move and flow into the signal output electrode 115. The electric charge that has flowed into the signal output electrode 115 is output as a current signal and input to the amplifier 151. As described above, the amplifier 151 converts and amplifies the signal, and the converted and amplified signal is output from the amplifier 151. As a result, the radiation detector 1 outputs a signal proportional to the radiation energy.

Figure 5:
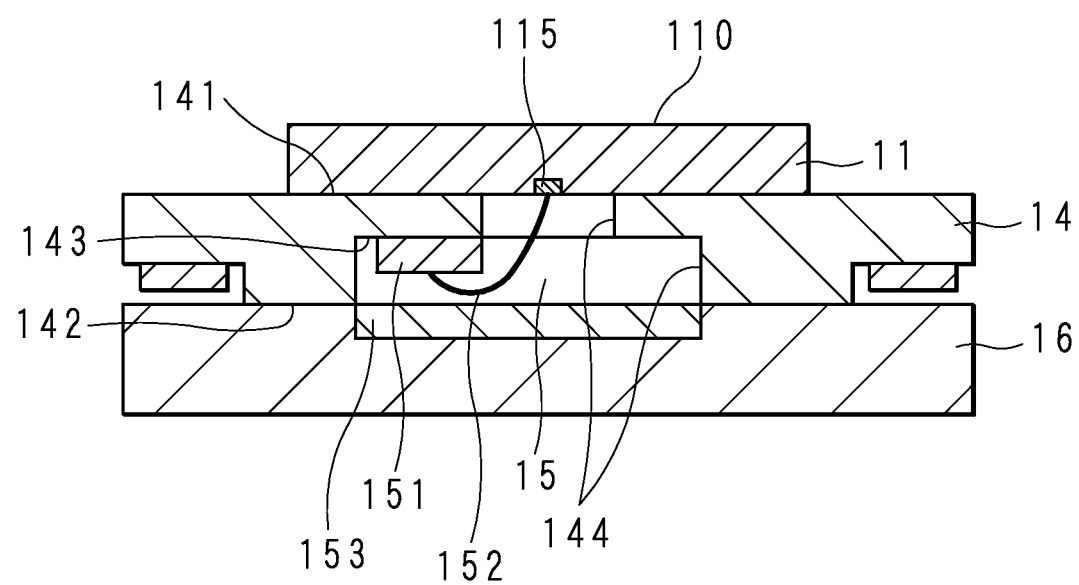
FIG. 5 is an enlarged schematic cross-sectional view of the part where the radiation detection element, a substrate, and a shield plate according to Embodiment 1 are joined.

FIG. 5 is an enlarged schematic cross-sectional view of the part where the radiation detection element 11, the substrate 14, and the shield plate 16 according to Embodiment 1 are joined. In FIG. 5, the parts of the radiation detector 1 other than the radiation detection element 11, the substrate 14, and the shield plate 16 are omitted, and the structure of the radiation detection element 11 is omitted except for the signal output electrode 115. A through hole 144 penetrating the substrate 14 between the first surface 141 and the second surface 142 is formed in the substrate 14. One end of the through hole 144 is open to the first surface 141, and the other end of the through hole 144 is open to the second surface 142. The shape of the through hole 144 is greatly expanded midway from one end toward the other end. The size of the other end of the through hole 144 is larger than the size of one end of the through hole 144. The shape of the through hole 144 is substantially constant from one end to the expanded part and substantially constant from the expanded part to the other end. The shapes of one end and the other end of the through hole 144 may be circular or polygonal. The shapes of one end and the other end of the through hole 144 may be the same or different.

A planar third surface 143 is formed on the inner surface of the through hole 144. The third surface 143 is substantially parallel to the first surface 141 and the second surface 142, is positioned behind the first surface 141, and faces the shield plate 16. The amplifier 151 is mounted on the third surface 143.

Both ends of the through hole 144 are blocked by the radiation detection element 11 and the shield plate 16. The radiation detection element 11 is disposed at the position where one end of the through hole 144 is blocked. In addition, the radiation detection element 11 is in close contact with the first surface 141 directly or via an interposed object and seals one end of the through hole 144. The shield plate 16 faces the second surface 142 and the third surface 143 of the substrate 14 and is disposed at the position where the other end of the through hole 144 is blocked. The shield plate 16 is in close contact with the second surface 142 directly or via an interposed object and seals the other end of the through hole 144.

The space in the through hole 144 blocked at both ends forms a sealed closed space 15. In the related art, a space in a through hole formed in a substrate is connected to an opening portion in a side surface of the substrate, and no closed spaces are formed. In the present embodiment, the space in the through hole 144 blocked at both ends is connected to no opening portions. Gas exchange does not occur between the inside and outside of the closed space 15. The closed space 15 is decompressed or filled with an inert gas such as nitrogen gas or a dry gas such as dry carbon dioxide. The closed space 15 is not filled with a solid or liquid substance such as resin. For example, the closed space 15 is formed by joining the radiation detection element 11 and the shield plate 16 to the substrate 14 in a decompressed space or a space filled with an inert or dry gas. Since the radiation detection element 11, the substrate 14, and the shield plate 16 are disposed inside the cover 13, the closed space 15 is also disposed inside the cover 13. The incident surface 110 of the radiation detection element 11 does not face the closed space 15. A part of the back surface of the radiation detection element 11 faces the closed space 15.

The third surface 143 is in the closed space 15. Accordingly, the amplifier 151 is disposed in the closed space 15. In addition, the radiation detection element 11 is disposed at the position where the signal output electrode 115 faces one end of the through hole 144. Accordingly, the signal output electrode 115 faces the closed space 15. The bonding wire 152 connects the amplifier 151 to the radiation detection element 11 by being positioned in the closed space 15 with one end connected to the signal output electrode 115 and the other end connected to the amplifier 151.

Further, the radiation detector 1 includes a moisture getter 153 taking in moisture in the closed space 15. The moisture getter 153 is disposed at a position coming into contact with the gas in the closed space 15. The moisture getter 153 takes in the moisture contained in the gas in the closed space 15 by water vapor adsorption or water absorption. For example, the moisture getter 153 is an application-type desiccant and is applied to the surface of the shield plate 16 facing the closed space 15. The moisture getter 153 is applied to a part of the surface of the shield plate 16, and the shield plate 16 is disposed at the position where the part of the shield plate 16 to which the moisture getter 153 is applied faces the other end of the through hole 144. The moisture getter 153 may not be of application type. For example, the moisture getter 153 may be a solid substance disposed in the closed space 15.

Further, the radiation detector 1 may be provided with a gas getter 154 taking in the gas in the closed space 15 instead of or in addition to the moisture getter 153. The gas getter 154 is disposed at a position coming into contact with the gas in the closed space 15. The gas getter 154 takes in the gas in the closed space 15 by gas adsorption. The gas getter 154 has the property of taking in a gas other than water vapor. The gas taken in by the gas getter 154 is, for example, carbon dioxide. The gas getter 154 may have the property of taking in a plurality of types of gases and may also have the property of taking in water vapor. The gas getter 154 is applied to a part of the surface of the shield plate 16, and the shield plate 16 is disposed at the position where the part of the shield plate 16 to which the gas getter 154 is applied faces the other end of the through hole 144. The gas getter 154 may not be of application type. For example, the gas getter 154 may be a solid substance disposed in the closed space 15.

As described above, the radiation detector 1 includes the closed space 15 and the amplifier 151 is disposed in the closed space 15. In a case where the radiation detector 1 is used in a normal-pressure or low-vacuum environment, a gas such as water vapor is capable of entering the inside of the cover 13 through the opening portion 131. However, although the closed space 15 is inside the cover 13, the closed space 15 is sealed, and thus no gases enter the closed space 15. Accordingly, even in a case where the radiation detector 1 is used in a normal-pressure or low-vacuum environment, the gas that has entered from the outside of the radiation detector 1 is not adsorbed to the amplifier 151. In addition, the inside of the closed space 15 is decompressed or filled with an inert or dry gas. Accordingly, it is difficult for the water or gas in the closed space 15 to be adsorbed to the amplifier 151. Even in the event of inert gas adsorption to the amplifier 151, a reaction degrading the amplifier 151 is unlikely to occur. Accordingly, deterioration of the amplifier 151 attributable to water or gas adsorption is prevented, and degradation in the performance of the radiation detector 1 is suppressed. Since deterioration of the amplifier 151 is prevented, deterioration of the signal output from the radiation detector 1 is prevented and degradation in radiation detection accuracy is suppressed.

The signal output electrode 115 faces the closed space 15, and thus water or gas adsorption to the signal output electrode 115 is unlikely to occur. Even in the event of inert gas adsorption to the signal output electrode 115, a reaction degrading the signal output electrode 115 is unlikely to occur. Accordingly, degradation in the performance of the radiation detection element 11 attributable to deterioration of the signal output electrode 115 is prevented, and degradation in the performance of the radiation detector 1 is suppressed.

The radiation detector of the related art that has an opening portion not blocked by a window material is problematic in that the detector deteriorates more quickly than a radiation detector provided with a window having a window material. In developing a radiation detector with an unblocked opening portion, it has been found that a gas adhering to an amplifier and a signal output electrode is a main cause of deterioration. In the present embodiment, by making the space around the amplifier 151 and the signal output electrode 115 the closed space 15, water or gas adsorption to the amplifier 151 and the signal output electrode 115 is prevented as much as possible. The occurrence of the main cause of deterioration of the radiation detector 1 is prevented, and degradation in the performance of the radiation detector 1 is suppressed.

The closed space 15 is not filled with a solid or liquid substance such as resin. In a case where the closed space 15 is filled with a solid or liquid substance, the capacitance of the radiation detection element 11 increases and the signal-to-noise (SN) ratio of the signal output by the radiation detection element 11 deteriorates. In the present embodiment, the closed space 15 is not filled with a solid or liquid substance, and thus the capacitance of the radiation detection element 11 is not increased by the substance with which the closed space 15 is filled and the SN ratio does not deteriorate.

Since the moisture getter 153 is disposed in the closed space 15, the water in the closed space 15 is taken into the moisture getter 153. Accordingly, water adsorption to the amplifier 151 and the signal output electrode 115 is more effectively prevented. In addition, since the gas getter 154 is disposed in the closed space 15, the gas in the closed space 15 is taken into the gas getter 154. Accordingly, adsorption of the gas in the closed space 15 to the amplifier 151 and the signal output electrode 115 is more effectively prevented. Deterioration of the amplifier 151 and the signal output electrode 115 attributable to water or gas adsorption is more effectively prevented, and degradation in the performance of the radiation detector 1 is suppressed.

In the present embodiment, the radiation detector 1 includes the Peltier element 17, and the Peltier element 17 cools the radiation detection element 11. The cooling of the radiation detection element 11 leads to noise reduction and radiation detection accuracy improvement. By cooling the radiation detection element 11, adsorption of a gas such as water vapor to the amplifier 151 becomes easier. However, in the present embodiment, since the amplifier 151 is disposed in the closed space 15, gas adsorption to the amplifier 151 is prevented. Accordingly, the accuracy of radiation detection is improved while suppressing degradation in the performance of the radiation detector 1.

In addition, since the opening portion 131 is not blocked by a window material, the radiation incident on the radiation detection element 11 does not have to be transmitted through a window material. Accordingly, the radiation detector 1 is capable of detecting radiation that cannot be transmitted through a window material due to the low energy thereof. For example, it is possible to detect an element with low fluorescent X-ray energy by detecting low-energy fluorescent X-rays. In the present embodiment, it is possible to suppress degradation in the performance of the radiation detector 1 while enabling detection of low-energy radiation. Even in a case where the radiation detector 1 is used in a normal-pressure or low-vacuum environment, deterioration of the amplifier 151 attributable to water or gas adsorption is prevented and degradation in the performance of the radiation detector 1 is suppressed.

Although the radiation detector 1 in the present embodiment includes the Peltier element 17 as a cooling unit, the radiation detector 1 may include a cooling unit other than the Peltier element 17. Alternatively, the radiation detector 1 may include no cooling units.

Embodiment 2

Figure 6:
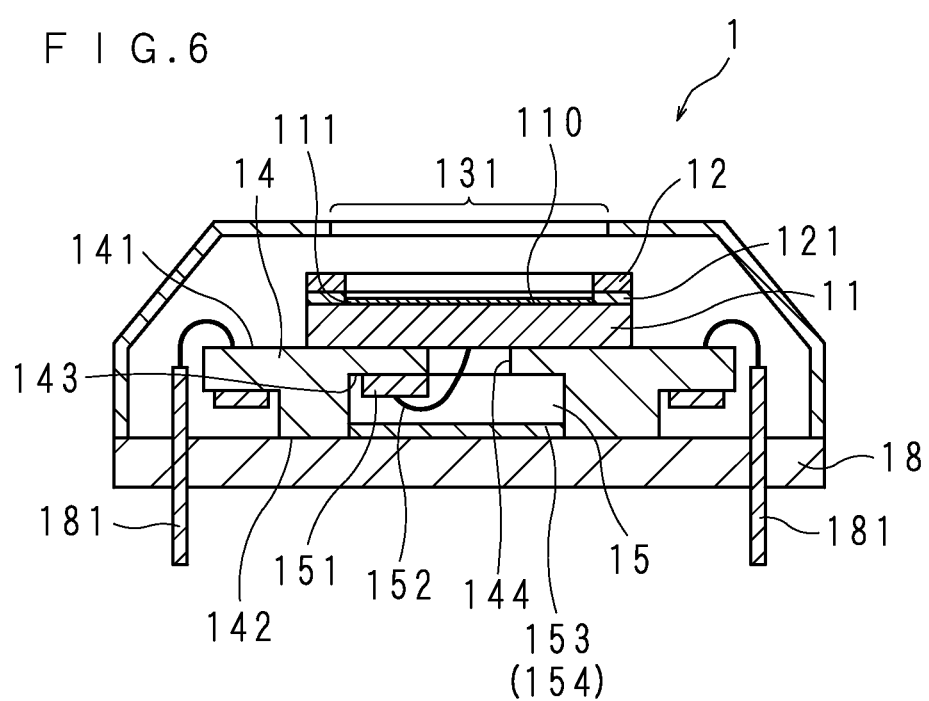
FIG. 6 is a schematic cross-sectional view illustrating a configuration example of a radiation detector according to Embodiment 2.

Embodiment 2 illustrates an example in which the radiation detector 1 includes no cooling units. FIG. 6 is a schematic cross-sectional view illustrating a configuration example of the radiation detector 1 according to Embodiment 2. The configuration of parts of the radiation detection apparatus 10 other than the radiation detector 1 is the same as that of Embodiment 1. The radiation detection element 11 is operable even without cooling by a cooling unit. The radiation detector 1 does not include the shield plate 16, the Peltier element 17, and the cold finger 172.

The second surface 142 of the substrate 14 faces the bottom plate portion 18. Both ends of the through hole 144 formed in the substrate 14 are blocked by the radiation detection element 11 and the bottom plate portion 18. The radiation detection element 11 is in close contact with the first surface 141 directly or via an interposed object and seals one end of the through hole 144. The bottom plate portion 18 blocks the other end of the through hole 144. The bottom plate portion 18 is in close contact with the second surface 142 directly or via an interposed object and seals the other end of the through hole 144. In Embodiment 2, the bottom plate portion 18 corresponds to a plate-shaped member. The heat of the radiation detection element 11 is conducted to the bottom plate portion 18 through the substrate 14 and released from the bottom plate portion 18 to the outside of the radiation detector 1.

The space in the through hole 144 blocked at both ends forms the sealed closed space 15. In other words, also in Embodiment 2, the radiation detector 1 includes the closed space 15. The incident surface 110 of the radiation detection element 11 does not face the closed space 15. The inside of the closed space 15 is decompressed or filled with an inert or dry gas. The amplifier 151 is disposed in the closed space 15, and the signal output electrode 115 faces the closed space 15. In addition, the moisture getter 153 and/or the gas getter 154 is disposed at a position coming into contact with the gas in the closed space 15. The moisture getter 153 and/or the gas getter 154 is applied to a part of the surface of the bottom plate portion 18, and the substrate 14 is disposed with respect to the bottom plate portion 18 such that the part of the bottom plate portion 18 to which the moisture getter 153 and/or the gas getter 154 is applied faces the other end of the through hole 144. The moisture getter 153 and/or the gas getter 154 may not be of application type.

In Embodiment 2 as well as Embodiment 1, water or gas adsorption to the amplifier 151 or the signal output electrode 115 is unlikely to occur even in a case where the radiation detector 1 is used in a normal-pressure or low-vacuum environment. Deterioration of the amplifier 151 or the signal output electrode 115 attributable to water or gas adsorption is prevented, degradation in the performance of the radiation detector 1 is suppressed, and degradation in radiation detection accuracy is suppressed.

Embodiment 3

Figure 7:
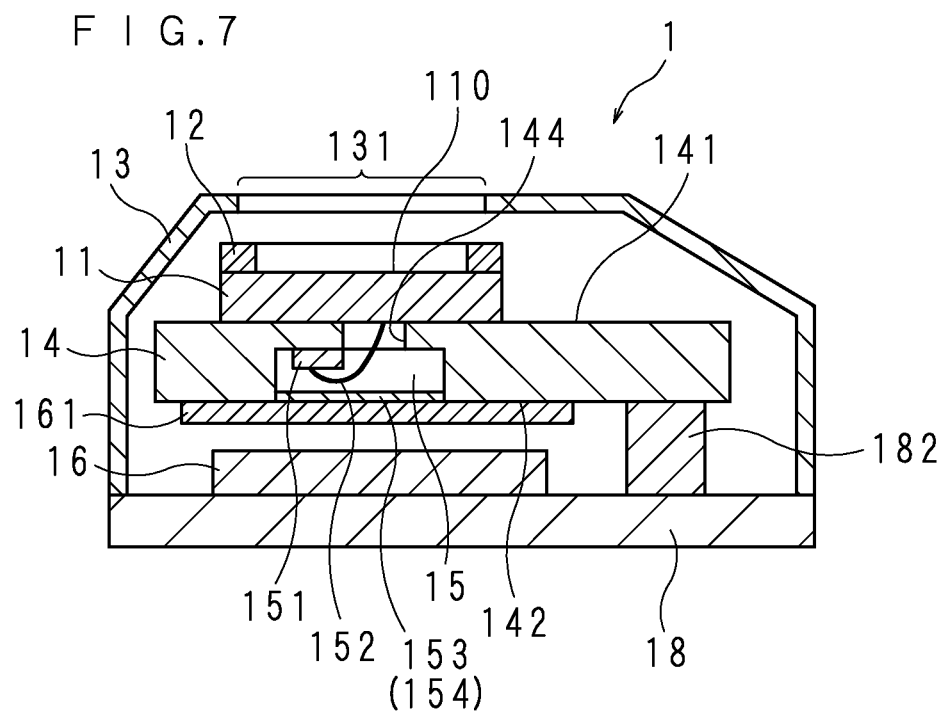
FIG. 7 is a schematic cross-sectional view illustrating a configuration example of a radiation detector according to Embodiment 3.

FIG. 7 is a schematic cross-sectional view illustrating a configuration example of the radiation detector 1 according to Embodiment 3. The configuration of parts of the radiation detection apparatus 10 other than the radiation detector 1 is the same as that of Embodiment 1. Also in Embodiment 3, the radiation detector 1 does not include a cooling unit such as the Peltier element 17 and the cold finger 172. The radiation detection element 11 is operable even without cooling by a cooling unit.

The radiation detector 1 includes the shield plate 16. A connector 182 is connected to a part of the second surface 142 of the substrate 14. The connector 182 is disposed between the part of the second surface 142 and the bottom plate portion 18 and is connected to the bottom plate portion 18. The connector 182 includes wiring, and the wiring connects a circuit provided on the substrate 14 and a circuit outside the radiation detector 1. Electric power supply and signal input and output with respect to the radiation detection element 11 are performed through the connector 182.

The radiation detection element 11 is in close contact with the first surface 141 of the substrate 14 directly or via an interposed object and seals one end of the through hole 144. The radiation detector 1 includes a closing plate 161 blocking the other end of the through hole 144. The closing plate 161 is disposed at a position facing the part of the second surface 142 to which the connector 182 is not connected. The closing plate 161 is in close contact with the second surface 142 directly or via an interposed object and seals the other end of the through hole 144. The closing plate 161 corresponds to a plate-shaped member. The radiation detector 1 includes the shield plate 16. In Embodiment 3, the shield plate 16 does not correspond to a plate-shaped member. The shield plate 16 is disposed at a position facing the closing plate 161. A gap is provided between the closing plate 161 and the shield plate 16. The shield plate 16 shields radiation incident from outside the shield plate 16 when viewed from the radiation detection element 11.

The space in the through hole 144 blocked at both ends forms the sealed closed space 15. In other words, also in Embodiment 3, the radiation detector 1 includes the closed space 15. The incident surface 110 of the radiation detection element 11 does not face the closed space 15. The inside of the closed space 15 is decompressed or filled with an inert or dry gas. The amplifier 151 is disposed in the closed space 15, and the signal output electrode 115 faces the closed space 15. In addition, the moisture getter 153 and/or the gas getter 154 is disposed at a position coming into contact with the gas in the closed space 15. The moisture getter 153 and/or the gas getter 154 is applied to a part of the closing plate 161, and the closing plate 161 is disposed such that the part of the closing plate 161 to which the moisture getter 153 and/or the gas getter 154 is applied faces the other end of the through hole 144. The moisture getter 153 and/or the gas getter 154 may not be of application type.

In Embodiment 3 as well as Embodiment 1, water or gas adsorption to the amplifier 151 or the signal output electrode 115 is unlikely to occur even in a case where the radiation detector 1 is used in a normal-pressure or low-vacuum environment. Deterioration of the amplifier 151 or the signal output electrode 115 attributable to water or gas adsorption is prevented, degradation in the performance of the radiation detector 1 is suppressed, and degradation in radiation detection accuracy is suppressed.

Embodiment 4

Figure 8:
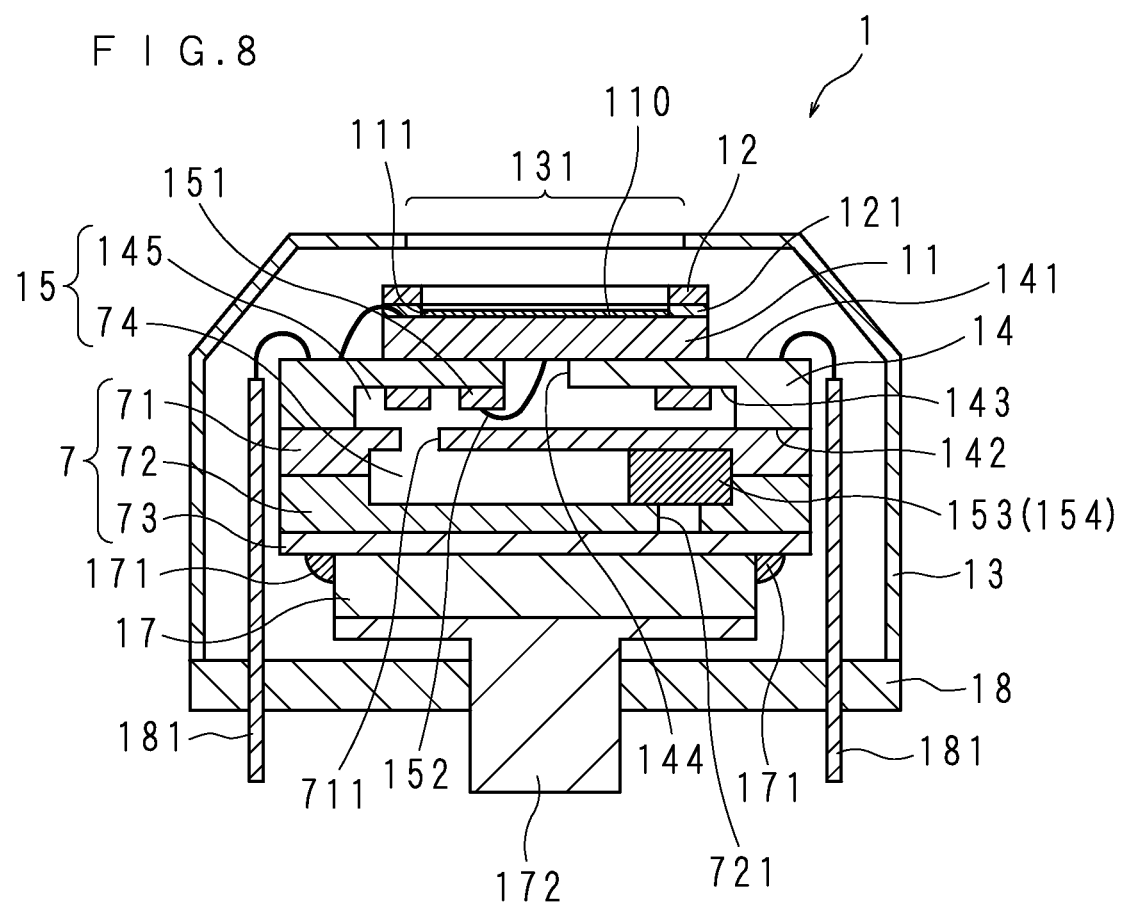
FIG. 8 is a schematic cross-sectional view illustrating a first example of the configuration of a radiation detector according to Embodiment 4.

FIG. 8 is a schematic cross-sectional view illustrating a first example of the configuration of the radiation detector 1 according to Embodiment 4. The configuration of parts of the radiation detection apparatus 10 other than the radiation detector 1 is the same as that of Embodiment 1. The configurations of the bottom plate portion 18 and the cover 13 are the same as those of Embodiment 1, and the opening portion 131 is formed at the truncated part of the tip of the cover 13. The configurations of the radiation detection element 11 and the collimator 12 are the same as those of Embodiment 1. The radiation detection element 11 is disposed on the first surface 141 of the substrate 14, and a shield plate 7 is disposed at a position facing the second surface 142. The shield plate 7 corresponds to a plate-shaped member. An interposed object such as an adhesive may be interposed between the shield plate 7 and the second surface 142.

The Peltier element 17 has a heat-absorbing part in thermal contact with the back surface of the shield plate 7 behind the surface of the shield plate 7 in contact with the substrate 14. The configurations of the Peltier element 17, the waterproof coating material 171, the cold finger 172, and the lead pin 181 are the same as those of Embodiment 1. The heat of the radiation detection element 11 is conducted to the heat-absorbing part of the Peltier element 17 through the substrate 14 and the shield plate 7 and released from the heat-dissipating part of the Peltier element 17 to the outside of the radiation detector 1 through the cold finger 172.

As in Embodiment 1, the through hole 144 is formed in the substrate 14 and the substrate 14 has the first surface 141, the second surface 142, and the third surface 143. The amplifier 151 is mounted on the third surface 143. In addition, circuit elements other than the amplifier 151 are also mounted on the third surface 143. Every circuit element included in the circuit provided on the substrate 14 may be mounted on the third surface 143. The amplifier 151 is connected to the signal output electrode of the radiation detection element 11 via the bonding wire 152.

One end of the through hole 144 is sealed by the radiation detection element 11, and the other end of the through hole 144 is blocked by the shield plate 7. The shield plate 7 includes a first shield plate 71, a second shield plate 72, and a third shield plate 73. The first shield plate 71, the second shield plate 72, and the third shield plate 73 are plate-shaped. The first shield plate 71 is disposed at a position facing the second surface 142 of the substrate 14, and the first shield plate 71 is in contact with the second surface 142. An interposed object such as an adhesive may be interposed between the first shield plate 71 and the second surface 142. The first shield plate 71, the second shield plate 72, and the third shield plate 73 are stacked and joined. The heat-absorbing part of the Peltier element 17 is in thermal contact with the third shield plate 73. The Peltier element 17 may be in direct contact with the third shield plate 73 or a thermally conductive substance may be interposed between the Peltier element 17 and the third shield plate 73. The shield plate 7 is made of a substance with somewhat high thermal conductivity. For example, the first shield plate 71 and the second shield plate 72 are made of alumina and the third shield plate 73 is made of Kovar.

Figure 10:
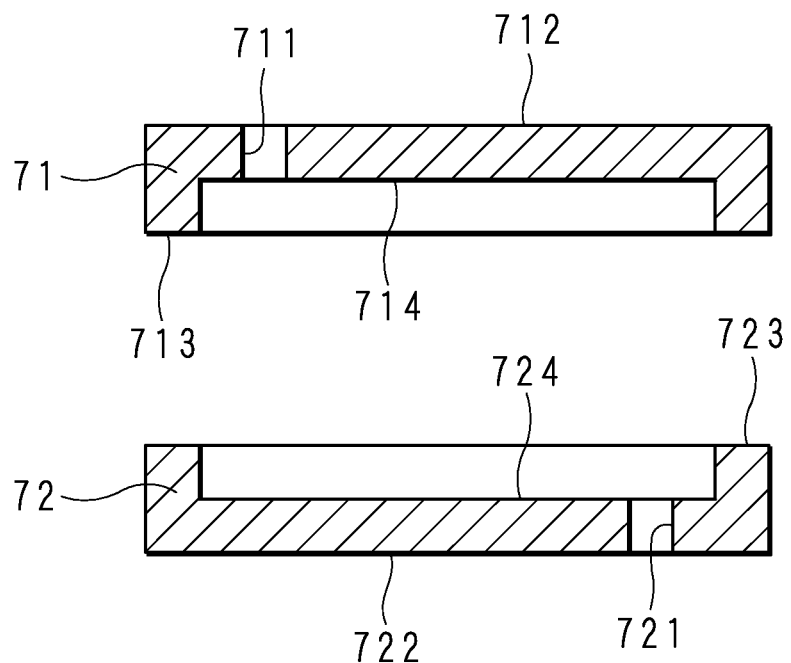
FIG. 10 is a schematic cross-sectional view illustrating the first shield plate and the second shield plate.

FIG. 9 is a schematic perspective view illustrating the first shield plate 71 and the second shield plate 72, and FIG. 10 is a schematic cross-sectional view illustrating the first shield plate 71 and the second shield plate 72. The first shield plate 71 has a tray shape as a whole and has a top surface 713 corresponding to the upper surface of the edge of the tray and a recessed surface 714 surrounded by the top surface 713 in plan view and recessed from the top surface 713. The recessed surface 714 is wider than the top surface 713. The first shield plate 71 has a bottom surface 712 behind the top surface 713 and the recessed surface 714. The thickness from the bottom surface 712 to the recessed surface 714 is thinner than the thickness from the bottom surface 712 to the top surface 713. A connecting hole 711 penetrating the first shield plate 71 from the bottom surface 712 to the recessed surface 714 is formed in the first shield plate 71. FIG. 9 illustrates an example in which three connecting holes 711 are formed in the first shield plate 71. The number of connecting holes 711 may be two or less or may be four or more.

The second shield plate 72 has the same shape as the first shield plate 71. In other words, the second shield plate 72 has connecting holes 721, a bottom surface 722, a top surface 723, and a recessed surface 724. The shield plate 7 is efficiently manufactured by the first shield plate 71 and the second shield plate 72 having the same shape. Although FIG. 9 illustrates an example in which the first shield plate 71 and the second shield plate 72 are hexagonal in plan view, the first shield plate 71 and the second shield plate 72 may have other shapes. The first shield plate 71 and the second shield plate 72 are stacked such that the top surface 713 and the top surface 723 face each other. The top surface 713 and the top surface 723 are closely attached and joined to each other. An interposed object such as an adhesive may be interposed between the first shield plate 71 and the second shield plate 72. The recessed surface 714 and the recessed surface 724 are not in contact with each other, and a space is sandwiched between the recessed surface 714 and the recessed surface 724. The space sandwiched between the recessed surface 714 and the recessed surface 724 is a cavity 74.

The first shield plate 71 and the second shield plate 72 are stacked such that the connecting hole 711 and the connecting hole 721 do not face each other. In other words, the first shield plate 71 and the second shield plate 72 are stacked such that the connecting hole 711 and the connecting hole 721 do not overlap in plan view, and the connecting hole 711 and the connecting hole 721 are at different positions in plan view.

The moisture getter 153 or the gas getter 154 is injected into the cavity 74 from the connecting hole 721. When the moisture getter 153 or the gas getter 154 is injected, the moisture getter 153 or the gas getter 154 is not injected by an amount at which the cavity 74 is filled. Accordingly, the moisture getter 153 or the gas getter 154 does not reach the position of the connecting hole 711. In this manner, the moisture getter 153 or the gas getter 154 is disposed at a position in the cavity 74 different from the connecting hole 711. The third shield plate 73 is stacked and joined to the second shield plate 72 so as to be closely attached to the bottom surface 722. An interposed object such as an adhesive may be interposed between the second shield plate 72 and the third shield plate 73. The third shield plate 73 seals the connecting hole 721. The shield plate 7 is configured in this manner.

The shield plate 7 is in close contact with the second surface 142 of the substrate 14. The diameter of the connecting hole 711 is smaller than the diameter of the through hole 144 in the second surface 142. The connecting hole 711 is disposed so as to face the other end of the through hole 144. A space 145 in the through hole 144 and the cavity 74 in the shield plate 7 are connected via the connecting hole 711. The space 145 and the cavity 74 connected to the space 145 via the connecting hole 711 form the closed space 15. One end of the through hole 144 is sealed by the radiation detection element 11, the connecting hole 721 is sealed by the third shield plate 73, and the closed space 15 is sealed as a result. The closed space 15 is decompressed or filled with an inert gas such as nitrogen gas or a dry gas such as dry carbon dioxide. In addition, circuit elements such as the amplifier 151 are disposed in the closed space 15, and the moisture getter 153 or the gas getter 154 is disposed in the closed space 15.

In Embodiment 4 as well as Embodiment 1, the amplifier 151 is disposed in the closed space 15 and the signal output electrode 115 of the radiation detection element 11 faces the closed space 15. Accordingly, even in a case where the radiation detector 1 is used in a normal-pressure or low-vacuum environment, water or gas adsorption to the amplifier 151 or the signal output electrode 115 is unlikely to occur. Deterioration of the amplifier 151 or the signal output electrode 115 attributable to water or gas adsorption is prevented, degradation in the performance of the radiation detector 1 is suppressed, and degradation in radiation detection accuracy is suppressed.

In addition, since the moisture getter 153 or the gas getter 154 is disposed at a position different from the connecting hole 711, a part of the shield plate 7 is between the moisture getter 153 or the gas getter 154 and the radiation detection element 11. Accordingly, even in the event of characteristic X-ray generation from the moisture getter 153 or the gas getter 154, this characteristic X-ray is shielded by the shield plate 7 and is unlikely to be incident on the radiation detection element 11. Accordingly, a system peak attributable to incidence on the radiation detection element 11 of a characteristic X-ray generated from the moisture getter 153 or the gas getter 154 is unlikely to occur. As a result, degradation in radiation detection accuracy is further suppressed.

Figure 11:
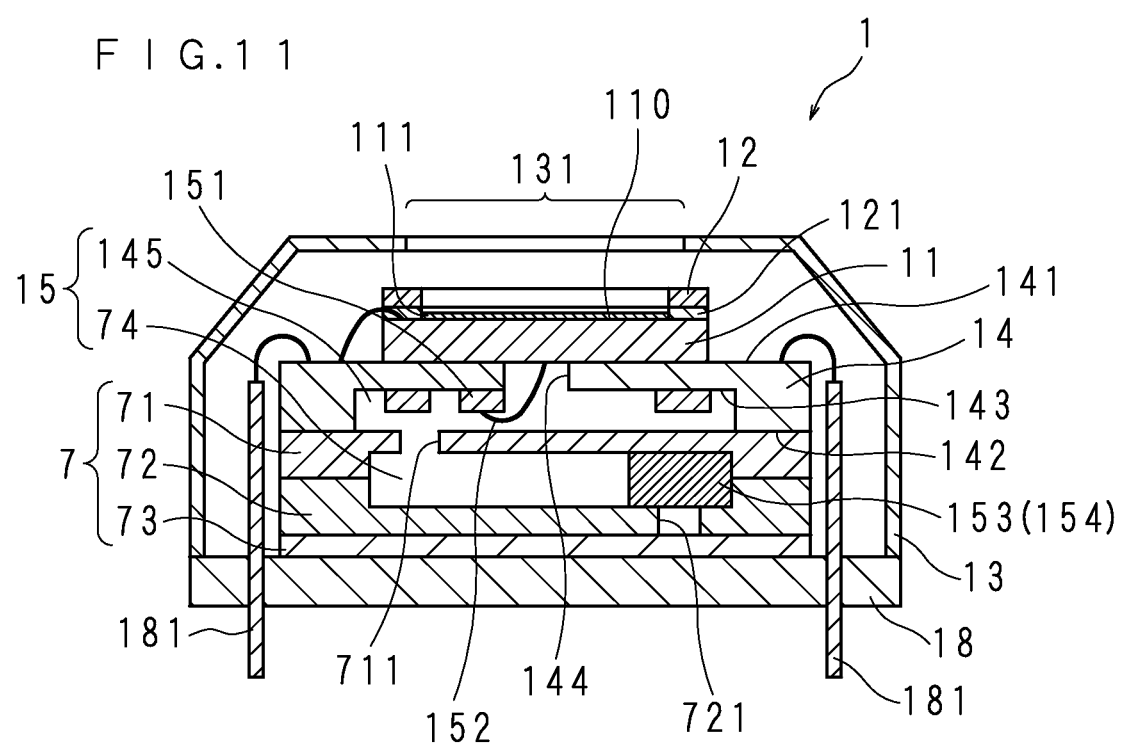
FIG. 11 is a schematic cross-sectional view illustrating a second example of the configuration of the radiation detector according to Embodiment 4.

FIG. 11 is a schematic cross-sectional view illustrating a second example of the configuration of the radiation detector 1 according to Embodiment 4. As in Embodiment 2, the radiation detection element 11 is operable even without cooling by a cooling unit. The radiation detector 1 does not include a cooling unit such as the Peltier element 17 and the cold finger 172. The third shield plate 73 included in the shield plate 7 is in close contact with the bottom plate portion 18 directly or via an interposed object. The heat of the radiation detection element 11 is conducted to the bottom plate portion 18 through the substrate 14 and the shield plate 7 and released from the bottom plate portion 18 to the outside of the radiation detector 1. It should be noted that the shield plate 7 may not include the third shield plate 73 and the connecting hole 721 may be blocked by the bottom plate portion 18.

In the form illustrated in FIG. 11 as well, water or gas adsorption to the amplifier 151 or the signal output electrode 115 is unlikely to occur even in a case where the radiation detector 1 is used in a normal-pressure or low-vacuum environment. Deterioration of the amplifier 151 or the signal output electrode 115 attributable to water or gas adsorption is prevented. In addition, a characteristic X-ray generated from the moisture getter 153 or the gas getter 154 is unlikely to be incident on the radiation detection element 11, and a system peak attributable to the moisture getter 153 or the gas getter 154 is unlikely to occur. Accordingly, degradation in radiation detection accuracy is suppressed.

Although the radiation detector 1 includes a housing in Embodiments 1 to 4, the radiation detector 1 may have no housing. For example, the radiation detector 1 may be configured without the cover 13. The configuration of the part other than the housing of the radiation detector 1 is the same as those of Embodiments 1 to 4. Also in this form, the closed space 15 is disposed at a position that the incident surface 110 of the radiation detection element 11 does not face. In this form as well, water or gas adsorption to the amplifier 151 or the signal output electrode 115 is unlikely to occur and deterioration of the amplifier 151 or the signal output electrode 115 attributable to water or gas adsorption is prevented.

In Embodiments 1 to 4, the radiation detector 1 includes the amplifier 151 in the closed space 15. The radiation detector 1 may include circuit elements other than the amplifier 151 in addition to or in place of the amplifier 151 in the closed space 15.

Although the radiation detection element 11 is a silicon drift-type radiation detection element in Embodiments 1 to 4, the radiation detection element 11 may be an element other than a silicon drift-type radiation detection element insofar as the radiation detection element 11 is a semiconductor element. Accordingly, the radiation detector 1 may be a non-SDD radiation detector. Although the sample 6 is irradiated with radiation and the radiation generated from the sample 6 is detected in Embodiments 1 to 4, the radiation detection apparatus 10 may detect radiation transmitted through the sample 6 or reflected by the sample 6. The radiation detection apparatus 10 may scan the sample 6 with radiation by changing the direction of the radiation. The radiation detection apparatus 10 may not include the irradiation unit 4, the sample table 5, the analysis unit 32, or the display unit 33.

The present invention is not limited to the content of the embodiments described above, and various modifications are possible within the scope of the claims. In other words, the technical scope of the present invention also includes an embodiment obtained by combining technical means appropriately modified within the scope of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A radiation detector comprising a radiation detection element having an incident surface where radiation is incident and a circuit element, wherein
   a closed space disposed at a position not facing the incident surface is provided,
   the circuit element is disposed in the closed space, and
   the closed space is decompressed or filled with an inert gas or a dry gas.

2. The radiation detector according to claim 1, further comprising
   a housing accommodating the radiation detection element and the circuit element, wherein
   the housing has an unblocked opening portion, and
   the closed space is disposed inside the housing.

3. The radiation detector according to claim 2, wherein the radiation detection element is disposed at a position facing the opening portion.

4. The radiation detector according to claim 1, wherein the radiation detection element has an electrode connected to the circuit element, and
   the electrode faces the closed space.

5. The radiation detector according to claim 1, further comprising
   a moisture getter taking in moisture in the closed space.

6. The radiation detector according to claim 1, further comprising
   a gas getter taking in a gas in the closed space.

7. The radiation detector according to claim 1, further comprising:
   a substrate having a first surface and a second surface positioned behind the first surface; and
   a plate-shaped member, wherein
   the substrate has a through hole penetrating the substrate between the first surface and the second surface,
   the radiation detection element is disposed on the first surface and blocks one end of the through hole, the plate-shaped member is disposed so as to face the second surface and blocks the other end of the through hole, and the closed space is a space in the through hole blocked at both ends by the radiation detection element and the plate-shaped member.

8. The radiation detector according to claim 1, further comprising:

a substrate having a first surface and a second surface positioned behind the first surface; and a plate-shaped member having a cavity inside, wherein the substrate has a through hole penetrating the substrate between the first surface and the second surface, the radiation detection element is disposed on the first surface and blocks one end of the through hole, the plate-shaped member is disposed so as to face the second surface and blocks the other end of the through hole, the plate-shaped member has a connecting hole smaller in diameter than the through hole and connecting a space in the through hole and the cavity, at a part facing the second surface, the closed space includes the space in the through hole blocked at both ends by the radiation detection element and the plate-shaped member and the cavity connected to the space via the connecting hole, and a moisture getter taking in moisture in the closed space or a gas getter taking in a gas in the closed space is disposed at a position in the cavity different from the connecting hole.

9. The radiation detector according to claim 1, further comprising a cooling unit for cooling the radiation detection element.

10. The radiation detector according to claim 1, wherein the circuit element configures at least a part of an amplifier circuit amplifying a signal output by the radiation detection element.

11. A radiation detection apparatus, comprising:

the radiation detector according to claim 1; and a spectrum generation unit generating a spectrum of radiation detected by the radiation detector.

12. The radiation detection apparatus according to claim 11, further comprising:

an irradiation unit irradiating a sample with radiation; and a display unit displaying the spectrum generated by the spectrum generation unit, wherein the radiation detector detects radiation generated from the sample.

\* \* \* \* \*